UNITED STATES PATENT OFFICE.

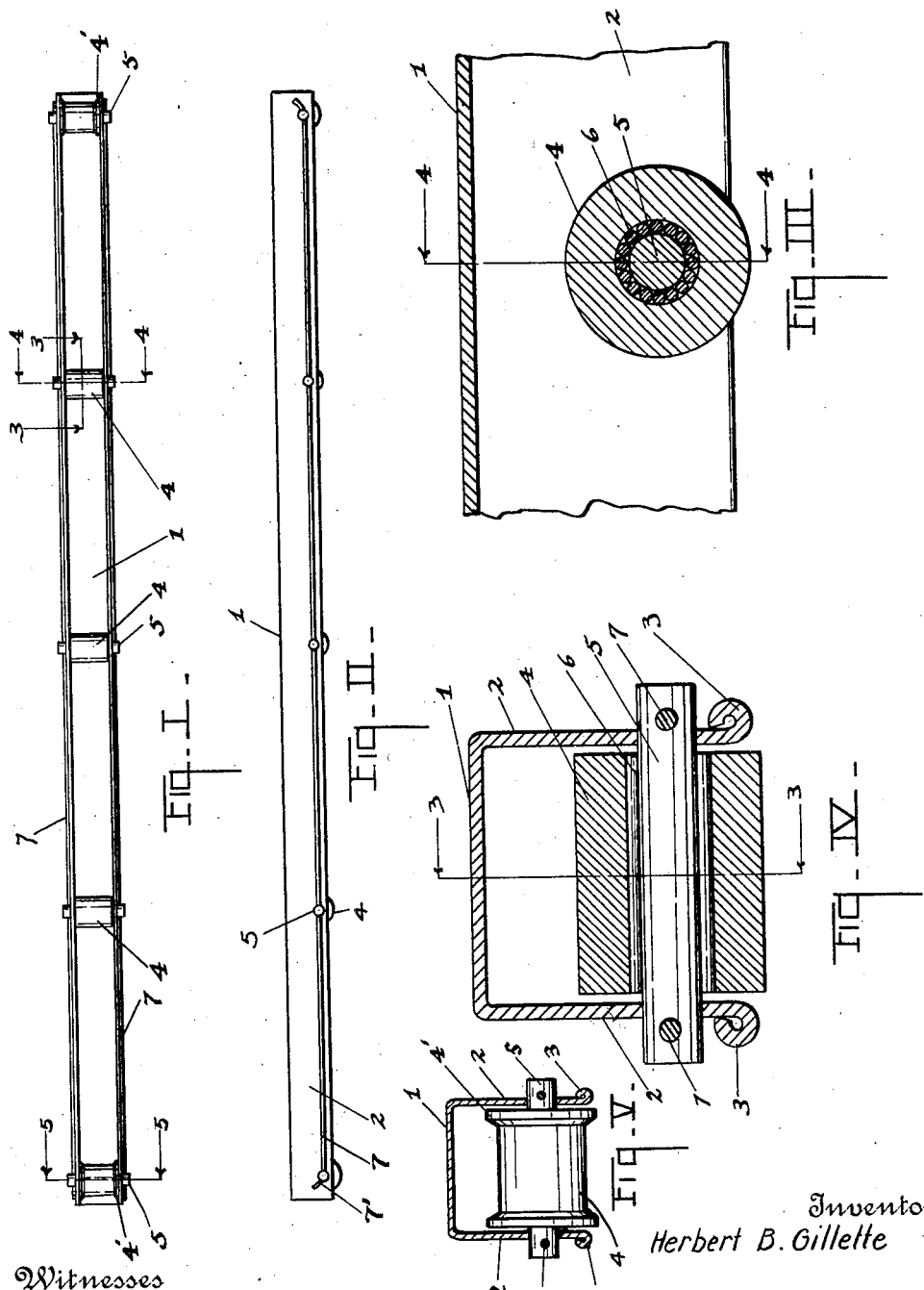

HERBERT B. GILLETTE, OF GRAND RAPIDS, MICHIGAN.

DRY-KILN TRUCK.

1,383,462.  Specification of Letters Patent.  Patented July 5, 1921.

Application filed April 5, 1920. Serial No. 371,447.

*To all whom it may concern:*

Be it known that I, HERBERT B. GILLETTE, a citizen of the United States, residing at Grand Rapids, in the county of Kent and State of Michigan, have invented certain new and useful Improvements in Dry-Kiln Trucks, of which the following is a specification.

This invention relates to improvements in dry kiln trucks.

The objects of the invention are to provide a very economical, compact, strong roller bearing dry kiln truck.

Objects pertaining to details will definitely appear from the detailed description to follow.

I accomplish the objects of my invention by the devices and means described in the following specification. The invention is clearly defined and pointed out in the appended claims. A structure which is a preferred embodiment of my invention is illustrated in the accompanying drawing, forming a part of this specification, in which:

Figure I is an inverted detail plan view of my improved truck.

Fig. II is a side elevation of the same.

Fig. III is a detail longitudinal sectional view on line 3—3 of Figs. I and IV showing details of the wheel and roller bearing.

Fig. IV is an enlarged detail transverse sectional view on line 4—4 of Figs. I and III showing one of the plain wheels and roller bearings in relation to the other parts.

Fig. V is an enlarged detail transverse sectional view on line 5—5 of Fig. I showing details of one of the flanged wheels at the end of the truck.

In the drawing all of the sectional views are taken looking in the direction of the little arrows at the ends of the section lines and similar numerals of reference refer to similar parts throughout the several views.

The body 1 of my improved truck is of channel form, preferably being formed from sheet metal, having a main top portion and sides 2, 2 which terminate in beads 3, 3 at the lower edge.

Wheels 4, the end ones of which are provided with flanges 4', are disposed between the sides 2, 2 and are of such length that only proper clearance is given between the ends of the wheels and the said sides. These are carried on short axles 5, which extend entirely through the sides 2, 2 and are preferably provided with roller bearings 6, which are of the same length as the wheels and are consequently retained effectively in position by the sides 2, 2 of the truck body.

Locking rods 7, one at each side, extend through transverse holes in the axles 5, just outside of the body sides 2, and are bent abruptly at their ends at 7' to retain them in position. This provides a strong rod support, retains the axles 5 against rotation, which is very desirable where roller bearings are interposed, and adds greatly to the strength of the entire body portion, because by this means it is possible to use a substantial rod for the retaining means for the said axles.

It is perfectly clear that the rollers might be omitted, and a plain bearing truck be made in this way. I also desire to state that while I have shown the body 1 as a continuous sheet of metal, the same could be made up of sides 2, 2 secured together in various ways, thereby of course losing the very great advantage of the continuous construction but still making available some of the other features.

From the above it will be clear that my improved truck can be very greatly varied in details without departing from the broad features of my invention. I desire, however, to claim the same broadly, but the specific features as well, as pointed out in the appended claims.

Having thus described my invention, what I claim as new and desire to secure by Letters Patent, is:

1. A dry kiln truck, the body of which is formed integrally in channel form from a sheet of metal with the sides parallel, with strengthening beads rolled at the edges, transverse axles disposed therethrough, wheels on the said axles, with roller bearings for said axles interposed between the said sides, the end wheels being flanged, and longitudinal locking rods disposed through the ends of the said axles outside of the sides of the said body, all coacting substantially as described for the purpose specified.

2. A dry kiln truck, the body of which is formed integrally in channel form from a sheet of metal with the sides parallel, transverse axles disposed therethrough, wheels on the said axles, with roller bearings for said axles interposed between the said sides, the end wheels being flanged, and longitudinal locking rods disposed through the ends of the said axles outside of the sides of the said body, all coacting substantially as described for the purpose specified.

3. A dry kiln truck, the body of which is formed integrally in channel form from a sheet of metal with the sides parallel, transverse axles disposed therethrough, wheels on the said axles, the end wheels being flanged, and longitudinal locking rods disposed through the ends of the said axle outside of the sides of the said body, all coacting substantially as described for the purpose specified.

4. A dry kiln truck, the body of which is formed integrally in channel form from a sheet of metal with the sides parallel with strengthening beads rolled at the edges, transverse axles disposed therethrough, and wheels on the said axles of the full length of the axle between the said sides, with roller bearings interposed between the same, the end wheels being flanged, all coacting substantially as described for the purpose specified.

5. A dry kiln truck, the body of which is formed integrally in channel form from a sheet of metal with the sides parallel, transverse axles disposed therethrough, and wheels on the said axles of the full length of the axle between the said sides with roller bearings interposed between the same, the end wheels being flanged, all coacting substantially as described for the purpose specified.

6. A dry kiln truck, the body of which is formed integrally in channel form from a sheet of metal with the sides parallel, transverse axles disposed therethrough, and wheels on the said axles of the full length of the axle between the said sides, the end wheels being flanged, all coacting substantially as described for the purpose specified.

7. A dry kiln truck, the body of which is provided with parallel sheet metal sides, transverse axles disposed therethrough, wheels on the said axles, with roller bearings interposed between the same, the end wheels being flanged, and longitudinal locking rods disposed through the ends of the said axle outside of the sides of the said body, all coacting substantially as described for the purpose specified.

8. A dry kiln truck, the body of which is provided with parallel sheet metal sides, transverse axles disposed therethrough, wheels on the said axles, the end wheels being flanged, and longitudinal locking rods disposed through the ends of the said axle outside of the sides of the said body, all coacting substantially as described for the purpose specified.

9. A dry kiln truck, the body of which is provided with parallel sheet metal sides, transverse axles disposed therethrough, wheels on the said axles of the full length of the axle between the said sides, the end wheels being flanged and the intermediate wheels being straight, all coacting substantially as described for the purpose specified.

In witness whereof, I have hereunto set my hand and seal in the presence of two witnesses.

HERBERT B. GILLETTE. [L. S.]

Witnesses:
 MAUDE L. KELLY,
 ALICE F. GILLETTE.